United States Patent
Dickins et al.

(10) Patent No.: US 10,959,032 B2
(45) Date of Patent: Mar. 23, 2021

(54) SYSTEM AND METHOD FOR SPATIAL PROCESSING OF SOUNDFIELD SIGNALS

(71) Applicant: Dolby Laboratories Licensing Corporation, San Francisco, CA (US)

(72) Inventors: Glenn N. Dickins, Como (AU); David Gunawan, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/077,040

(22) PCT Filed: Feb. 9, 2017

(86) PCT No.: PCT/US2017/017204
§ 371 (c)(1),
(2) Date: Aug. 9, 2018

(87) PCT Pub. No.: WO2017/139473
PCT Pub. Date: Aug. 17, 2017

(65) Prior Publication Data
US 2019/0045315 A1     Feb. 7, 2019

Related U.S. Application Data (60) Provisional application No. 62/293,104, filed on Feb. 9, 2016.

(30) Foreign Application Priority Data

Feb. 9, 2016 (EP) .................................. 16154889

(51) Int. Cl.
*H04S 7/00*     (2006.01)
*H04S 3/00*     (2006.01)
(Continued)

(52) U.S. Cl.
CPC ................ *H04S 7/30* (2013.01); *G06F 3/017* (2013.01); *G06F 3/04812* (2013.01);
(Continued)

(58) Field of Classification Search
CPC ........ H04S 7/30; H04S 3/002; H04S 2400/11; H04S 2400/13; H04S 2400/15;
(Continued)

(56) References Cited

U.S. PATENT DOCUMENTS

| 7,957,547 | B2 * | 6/2011 | Chin | ...................... | G11B 27/34 |
| | | | | | 381/306 |
| 8,977,293 | B2 | 3/2015 | Rodriguez | | |

(Continued)

FOREIGN PATENT DOCUMENTS

| WO | 2014/090277 | 6/2014 |
| WO | 2014/0147442 | 9/2014 |
| WO | 2014/155153 | 10/2014 |

OTHER PUBLICATIONS

Nix, J. et al "Combined Estimation of Spectral Envelopes and Sound Source Direction of Concurrent Voices by Multidimensional Statistical Filtering", Mar. 2007 IEEE, Audio, Speech, and Language Processing, IEEE Transactions on vol. 15, Issue: 3, pp. 995-1008.

(Continued)

*Primary Examiner* — Hemant S Patel
*Assistant Examiner* — David Siegel (57) ABSTRACT

A method for interactive and user guided manipulation of multichannel audio content, the method including the steps of: providing a content preview facility for replay and review of multichannel audio content by a user; providing a user interface for the user selection of a segment of multichannel audio content having an unsatisfactory audio content; processing the audio content to include associated (Continued)

audio object activity spatial or signal space regions, to create a time line of activity where one or more spatial or signal space regions are active at any given time; matching the user's gesture input against at least one of the active spatial or signal space regions; signal processing the audio emanating from selected active spatial or signal space region using a number of differing techniques to determine at least one processed alternative; providing the user with an interactive playback facility to listen to the processed alternative.

15 Claims, 8 Drawing Sheets

(51) Int. Cl.
*G06F 3/01* (2006.01)
*G06F 3/0481* (2013.01)
*G10L 19/008* (2013.01)
*H04R 1/40* (2006.01)

(52) U.S. Cl.
CPC ............ *G10L 19/008* (2013.01); *H04S 3/002* (2013.01); *H04R 1/406* (2013.01); *H04R 2499/11* (2013.01); *H04S 2400/11* (2013.01); *H04S 2400/15* (2013.01)

(58) Field of Classification Search
CPC ...... G06F 3/017; G06F 3/04812; G06F 3/165; G10L 19/008; H04R 1/406; H04R 2499/11
See application file for complete search history.

(56) References Cited

U.S. PATENT DOCUMENTS

| | | |
|---|---|---|
| 9,349,384 B2 | 5/2016 | Gunawan |
| 9,451,379 B2 | 9/2016 | Gunawan |
| 2004/0172240 A1 | 9/2004 | Crockett |
| 2007/0287490 A1* | 12/2007 | Green ................... G11B 27/34 455/523 |
| 2012/0082322 A1 | 4/2012 | Van Waterschoot |
| 2012/0207309 A1 | 8/2012 | Eppolito |
| 2013/0121517 A1* | 5/2013 | Anderson .............. H04R 25/50 381/321 |
| 2013/0259238 A1 | 10/2013 | Xiang |
| 2013/0272548 A1 | 10/2013 | Visser |
| 2014/0286497 A1 | 9/2014 | Thyssen |
| 2014/0297678 A1* | 10/2014 | Algreatly .......... G06F 16/90335 707/769 |
| 2015/0054943 A1 | 2/2015 | Zad Issa |
| 2015/0086038 A1 | 3/2015 | Stein |
| 2015/0110310 A1 | 4/2015 | Minnaar |
| 2015/0189457 A1 | 7/2015 | Donaldson |

OTHER PUBLICATIONS

Okuno, H.G. et al., "Robot Audition from the Viewpoint of Computational Auditory Scene Analysis", year: 2008, IEEE, Informatics Education and Research for Knowledge-Circulating Society, 2008. ICKS 2008. International Conference on Jan. 17, 2008, pp. 35-40.

Chakraborty, R. et al. "Sound-model-based acoustic source localization using distributed microphone arrays", May 4-9, 2014, IEEE, Acoustics, Speech and Signal Processing (ICASSP), 2014 IEEE International Conference on acoustic, speech and signal processing (ICASSP), pp. 619-623.

Dickins, G. et al. "On the potential for scene analysis from compact microphone arrays", Proc. 52 AES International Conference on sound field control—Engineering and perception, Sep. 2, 2013, Guildford, UK. pp. 1-10.

Dickins, G. N. et al "On the Spatial Localization of a Wireless Transmitter from a Multisensor Receiver" Signal Processing and Communication Systems, 2nd International Conference 2008.

* cited by examiner

Video Scene

FIG. 7

Audio Scene

FIG. 8

Time Line

FIG. 9

Video Scene

FIG. 10

Audio Scene

SYSTEM AND METHOD FOR SPATIAL PROCESSING OF SOUNDFIELD SIGNALS

FIELD OF THE INVENTION

The present invention relates to the field of processing of audio signals through the use of an applications "app" style environment.

REFERENCES

[1] Dickins, Glenn N., and Rodney A. Kennedy. "On the spatial localization of a wireless transmitter from a multi-sensor receiver." Signal Processing and Communication Systems, 2008. ICSPCS 2008. 2nd International Conference on. IEEE, 2008.

BACKGROUND OF THE INVENTION

Any discussion of the background art throughout the specification should in no way be considered as an admission that such art is widely known or forms part of common general knowledge in the field.

Personal and mobile computing and recording devices, such as the latest Apple iPhone or Samsung Android Phone devices, or tablet devices are now equipped with video and multichannel recording capabilities.

There is a trend of increasing use of such devices for the capture, manipulation and consumption of rich media content. As the technology and use is advancing, there is a desire and growing market for more sophisticated systems and tools that improve the created media. In particular, for the audio component of user generated content, there is an aspiration to be able to create idealized or movie style audio from the field captured recordings. Since much of movie sound is heavily processed, edited and re-recorded, this creates an area for technical innovation around systems and interfaces to allow users the ability to create more compelling and stylized audio.

There are many examples of tools and work flow for various processing and editing of audio and video content. Such tools generally involve a large amount of learning and skill to operate and achieve the desired results. In particular, managing time lines and multiple tracks of audio, configuring processing, and fitting a user interface suitable for this onto a small form factor mobile device is not generally practical.

Such systems normally require significant amounts of work in the aggressive decomposition and naming of audio objects, in addition to the operation of a complex user interface with audio wave forms and dragging of audio snippet selections. Complex audio filtering operations are provided by means of a wide selection of possible filtering operations, with complexity provided from the wide selection of possible filtering alternatives.

SUMMARY OF THE INVENTION

It is an object of the invention, to provide a more effective form of processing of soundfield signals.

In accordance with a first aspect of the present invention, there is provided a method for interactive and user guided manipulation of multichannel audio content, the method including the steps of: (a) providing a content preview facility for replay and review of multichannel audio content by a user; (b) providing a user interface for the user selection of a segment of the multichannel audio content having an unsatisfactory audio content; (c) processing the multichannel audio content to determine (e.g., identify) associated audio object activity spatial or signal space regions, to create a time line of activity where one or more spatial or signal space regions are active at any given time; (d) temporally correlating the user's selection of the segment of the multichannel audio content against at least one of the active spatial or signal space regions; (e) signal processing the audio emanating from the correlated active spatial or signal space region (e.g., using a number of differing techniques) to determine at least one processed alternative of modified audio; (f) providing the user with an interactive playback facility to listen to the at least one processed alternative of modified audio; and (g) upon user approval, updating the audio content to incorporate the processed alternative into the audio content. Said processing the multichannel audio content may involve performing a scene analysis of the multichannel audio content for determining (e.g., identifying) the object activity spatial or signal space regions. Said temporally correlating may involve comparing the user's selection of the segment of the multichannel audio content to the activity, over time, of the one or more spatial or signal space regions. Said signal processing may involve processing the audio emanating from the correlated active spatial or signal space region using a number of different techniques. The number of different techniques may correspond to the number of processed alternatives. Further, said signal processing may involve applying at least one filter to an audio object associated with the correlated active spatial or signal space region. Yet further, said signal processing may involve applying either enhancement or diminution filters (e.g., depending on the user's choice), to respectively enhance or reduce the relative importance of an audio object associated with the correlated active spatial or signal space region. There may be a plurality of processed alternatives (e.g., corresponding to different degrees of enhancement or different degrees of diminution), and the user may be provided with an interactive playback facility to listen to the plurality of processed alternatives, for receiving the user's selection of one of the plurality of processed alternatives.

The user interface for the user selection of a segment preferably can include a button activation interface. The button activation interface can comprise depressing a single button for a time period whilst audio content is unsatisfactory.

In some embodiments the method can further include the step of: (h) iteratively searching the multichannel audio content for further segments of multichannel content having active spatial or signal space regions similar to those identified by the user in step (b) and applying the processing of steps (c) to (f) to the identified further segments.

In some embodiments, the step (e) further can comprise utilising the number of changes in activity state to determine which active spatial or signal space region to apply signal processing to. For example, the number of changes in activity state (e.g., toggles, flanks, etc.) of the audio object spatial activity spatial or signal space regions may be compared to a number of changes from selected to non-selected segment parts (e.g., for a discontinuous segment selected by the user).

In accordance with a further aspect of the present invention, there is provided a system for the interactive and user guided manipulation of multichannel audio content, the system including: a first input means for capturing multichannel audio content; a scene analysis system for analysing the separate spatial characteristics of audio sources in the multichannel audio content producing corresponding approximate audio spatial characteristics for the audio sources; a user interface selection unit for selection by a user of at least one problematic audio segment of the multichannel audio content for analysis; a spatial characterisation unit for correlating the selected audio segment with one of the audio sources; a signal processing unit (e.g., filtering unit) for selectively applying signal processing (e.g., applying at least one filter) to alter the audio characteristics of the selected audio source relative to other non selected audio sources; a user interface display unit for displaying a number of alternative audio filtered segments of the selected audio source for review by the listener, and selection of a desired response; and an integration unit, for integrating the audio effects of the audio source into the multichannel audio content upon selection by the user. The scene analysis unit may be adapted to perform scene analysis of the multichannel audio content for determining (e.g., identifying) the audio sources in the multichannel audio content. The spatial characterization unit may be adapted to compare the user's selection of the problematic audio segment (e.g., a binary profile corresponding to the selection) to an activity of the one or more audio sources.

In some embodiments, the filtering unit applies either enhancement or diminution filters to the selected audio source depending on a user's choice. The system further can comprise an iterative looping unit for reviewing other portions of the audio content for similar sound sources.

BRIEF DESCRIPTION OF THE DRAWINGS

Embodiments of the invention will now be described, by way of example only, with reference to the accompanying drawings in which.

DETAILED DESCRIPTION

The preferred embodiments provide for a system and method which simplifies the audio production process.

The embodiments provide an interactive 'app' or web based plug in that are generally directed towards providing a wide user base the ability to "shape and focus their work into a highly evolved and dramatic form", much as is the role of a re-recording engineer in movie sound post production. More specifically, the embodiments deal with an innovative system to take simple user input, identify associated temporary or transient audio objects related to that input, and present alternative processing options of which one is selected to match the desired outcome of the user.

For example, where there is more than one microphone available, it is well known in the art of signal processing that various techniques exist for the selective processing of audio sources present in the scene. It is also reasonably known that for a particular sequence of captured content, the user may wish to manipulate the audio to create a better or more appropriate content. Generally such processing or manipulation involves promoting or reducing the presence of different audio objects in the audio mix, towards the user achieving the desired focus and clarity related to what was of interest in the captured content Towards a background for this invention, it is suggested that there are three main areas of technical development that are incrementally working towards improved and perfected solutions. The first is the ability to manipulate audio and incremental improvements in algorithms and techniques for isolating, enhancing and removing aspects of a recording. The second is in artificial intelligence or semantic understanding of audio scenes and context towards being able to interpret the activity in a scene. The third is the area of prediction and suggestion, in order to automatically determine the desired purpose and outcome of any processing and manipulation of the audio. The following sections provide a brief review of each of these areas as supplemental information. This information is presented towards introducing an alternate novel approach for achieving the larger goal of improved quality of, and user experience in, creating captured audio content.

1. Postcodes

Often the general framework for microphone array processing is in terms of angle of arrival, beamforming and source location. Such concepts apply well to classical antenna or microphone theory where the microphone and array consists of a well defined and often regular geometry of sensors located largely in free space or on some regular solid object. However, this approach has several drawbacks in terms of a pragmatic application. Generally compact devices, such as personal data assistant devices, are not regular, nor can the microphones considered to be in free space. Therefore the response of the array to the current spatial location of an audio emitter is complex, intricately related to the device itself, and possibly compromised in terms of variability from transducer and manufacture variation, and any additional proximate objects (like a user's hand). In any case, the ability of an array to extract, isolate or selectively process audio from a complex acoustic scene is limited by the system design, and does not represent regular regions of angular or spatial resolution around the device.

In the embodiments, it has been found that it is not necessary, in most signal processing, to immediately convert a response of the microphone array into anchored physical locations and regions around the reception device. An alternate approach of 'post codes' is defined as an idea of managing and processing audio in terms of the separability, in a multidimensional audio processing space. Whilst these post-codes can be mapped to likely external physical locations, this is not necessary for the signal processing. Postcodes conveniently represent a form of regularly tessellated regions within the audio processing space, and thus are intrinsically related to the ability to extract and selectively process audio objects, based on their relative position and size in the post code space. It is this post code space that may be utilised when identifying and labelling audio objects in the audio scene, in the embodiments.

Figure 1:
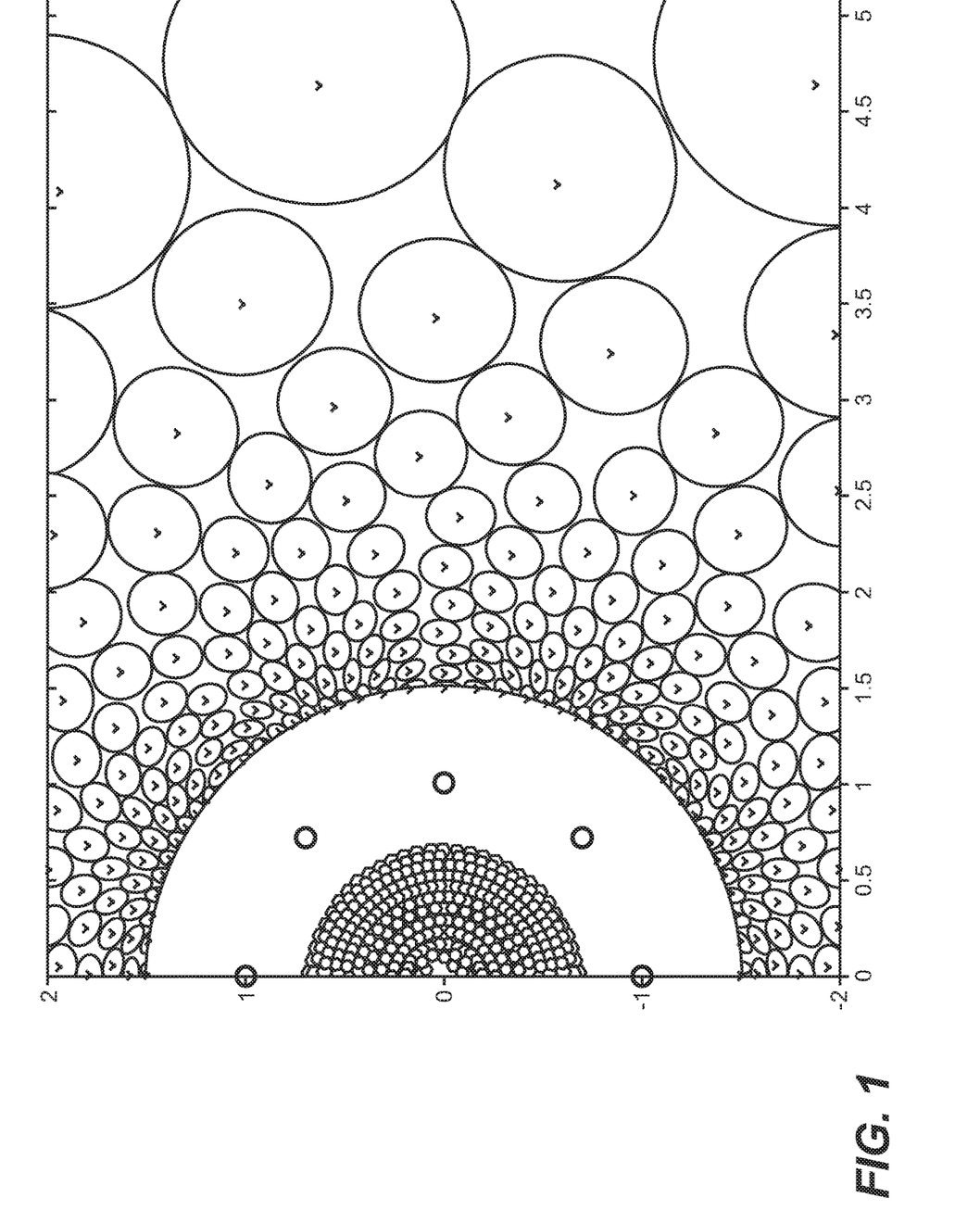
FIG. 1 illustrates schematically a simple array 'soundfield' model showing the concept of post codes. The array geometry and sensitivity devices regions of resolution that are non-uniform in real physical space. These regions correspond to the ability to detect, isolate and selectively process audio.

By way of example, FIG. 1, from reference [1], shows of the resolution of regions that may be determined around a regular and irregular array. The simple array model shows the concept of post codes. The array geometry and sensitivity of devices results in regions of resolution that are non-uniform in real physical space. These regions correspond to the ability to detect, isolate and selectively process audio. Whilst this is a simple model, it shows the general trend of the microphone array having more variability and uncertainty in physical location for sound sources that are further away.

A useful approach is to perform a mapping of the physical space into a feature space that has relatively constant variance in the feature observations for different objects regardless of position. Such feature space may relate to the space of postcodes described further below.

The embodiments of the invention can utilise information in the form of Scene Analysis to attempt to locate the participants around the audio input devices. One form of suitable scene analysis is that disclosed in United States Patent Application Publication US 2014/0241528 entitled "Sound Field Analysis System", assigned to the present applicant, the contents of which are incorporated by cross reference. The suitable form of scene analysis is also disclosed in "On the potential for Scene Analysis from Compact Microphone Arrays", Glenn Dickins, David Gunawan, Dong Shi, AES $52^{nd}$ International Conference, (2013), the contents of which are also incorporated by cross reference.

Figure 2:
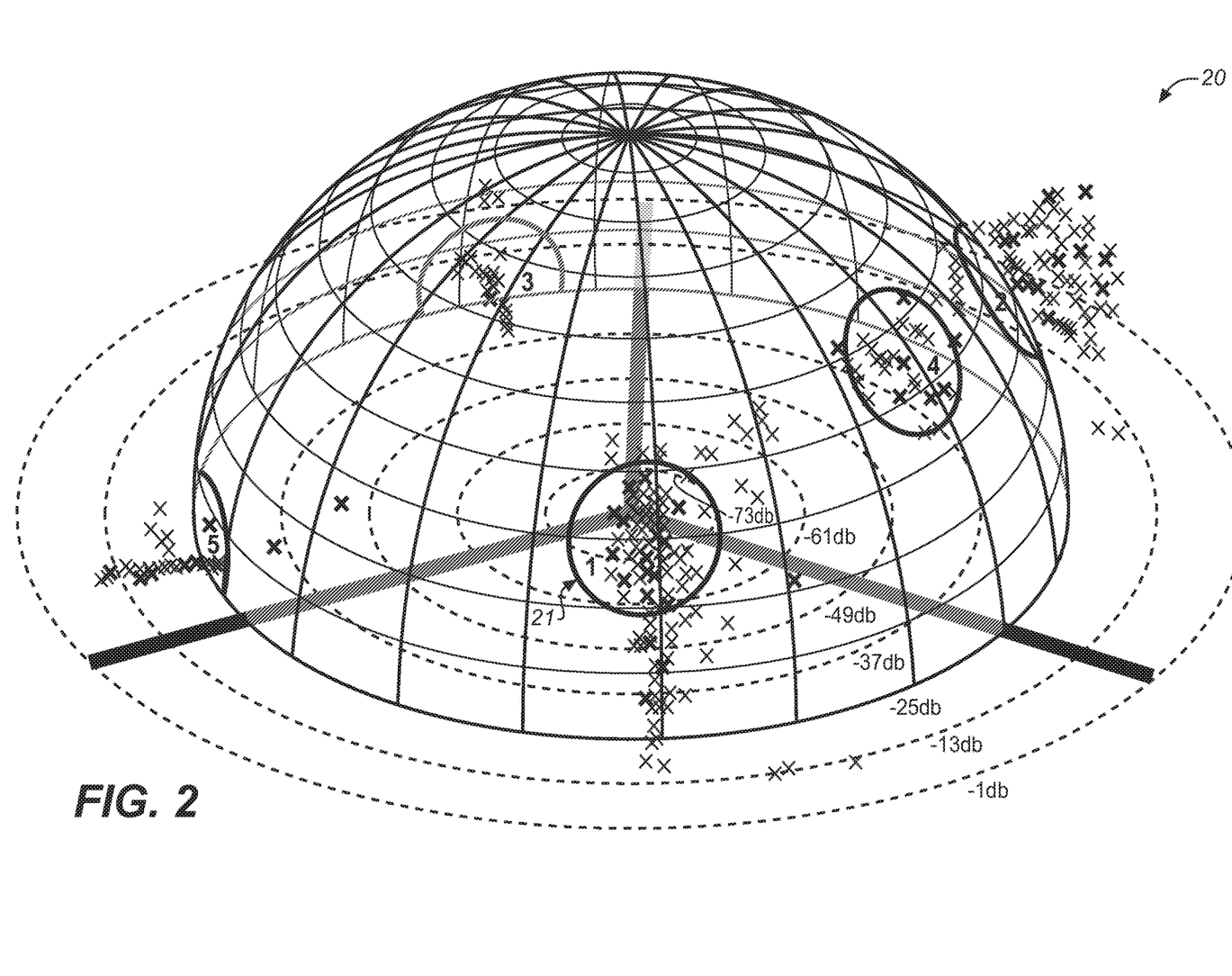
FIG. 2 illustrates the mapping of features into a regular space where the audio objects have similar variance regardless of their physical position. This figure shows the clustering and labelling of audio activity into regular 'postcodes' areas.

FIG. 2 illustrates an example mapping of features into a regular space where the audio objects have similar variance regardless of their physical position. This figure shows the clustering e.g. 21 and labelling of audio activity into regular 'postcodes'. In this figure, the audio is being captured from a horizontal planar array, and spatial audio features are extracted representing the angle of arrival and the direct to reverb ratio and the loudness. The direct to reverb ratio is calculated for the current activity and audio blocks using a combination of coherence and historical source activity. The angle of arrival is represented as the angle around the equator of this hemisphere, the direct to reverb ratio is mapped onto an angle of inclination above the equator. Greater detail of this approach of source characteristic estimation is set out in the aforementioned patent specification.

Audio processing has inherent tradeoffs, and scene analysis is increasingly complex to perfect, and the desired outcome can be subjective and situation dependent. Continued progression in isolation in each of these three areas may not significantly advance the experience of a user. A single disciplinary approach in each of these (audio DSP, machine learning and prediction) does often aim to reduce input or isolate the user from the process. A general engineering approach may seek to support or create a better experience and outcome by eliminating the user involvement. However, this approach can be seen as some-what misdirected. An appropriate level of user interaction can overcome some of the increasingly difficult algorithmic challenges, and furthermore involving the user in a creative and engaging way provides a sense of purpose and further value to the user in the creation experience.

The present embodiments provide a holistic approach to the capture, processing, user interface, directed manipulation and optimization to local information about the user, content and desired outcome.

In particular, the user interface aspect is related to engaging the user to resolve some of the inherent ambiguity of audio "re-recording". A useful analogy is made here to the production process of audio for film sound. In modern movie making environments, the process of making movie sound can involve a very heavy editing and rerecording of audio with many layers added together in a final audio mix.

This is pertinent, since in many cases the expectation or desired outcome of reprocessing user generated content may be towards creating something more similar to a movie. To achieve the expected results for movies, a large degree of creativity and human input is included in the effective audio processing.

Rather than performing deep analysis, and confronting the user with detail and complexity, the embodiments set out a way to intuitive allow the user to select and edit or replace segments of audio in the content. A useful analogy is the process of selecting text in a word processor to then allow for a local or global search and replace. The user simply visually identifies the region of the linear text that is problematic, selects it by dragging over, and then enters a replacement.

The embodiments utilise this idea to provide for, in use, the ability of dragging over or identifying a segment of audio by a simple touch associated with the timing of a segment of audio that is problematic, and then having the system intelligently suggest some alternatives for how that segment may be processed and end up sounding. The user can then choose the replacement, and additionally allow this edit instruction or replacement to occur across similar occurrences or events within the content, in a similar manner to a 'search and replace' operation familiar in a word processing environment.

Figure 3:
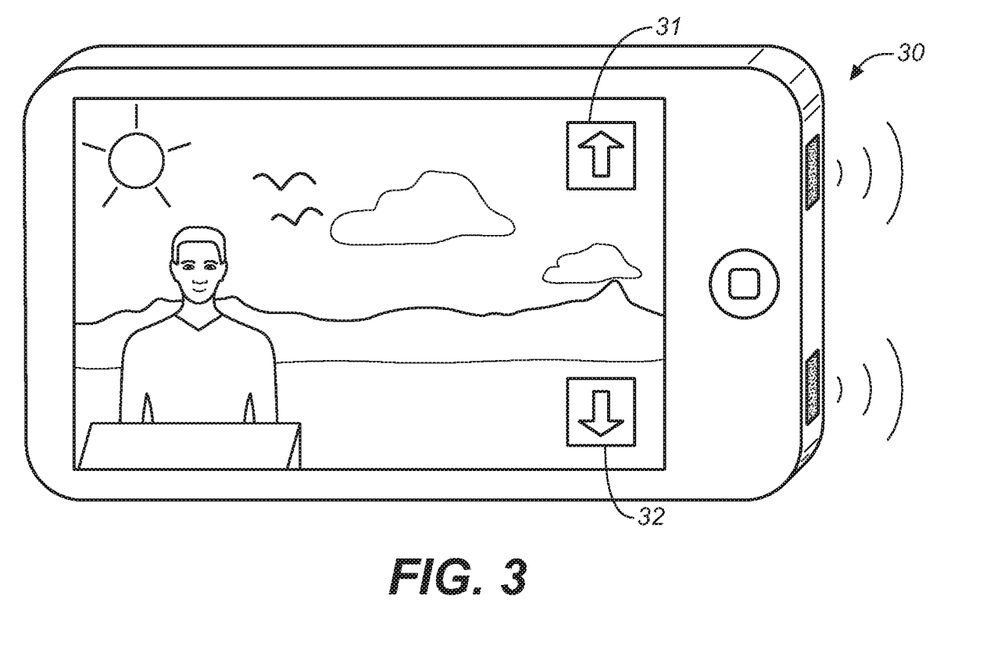
FIG. 3 shows an initial schematic of an example user interface on a mobile phone device.

To present the concept of the invention, a simple user interface 30 is shown in FIG. 3. The main screen displays the video associated with the audio content (the embodiments can extend to audio only content). Two simple user interface elements are provided; a control to signal the time region and desire to promote or increase focus 31 on some activity or sound event at that time, and a similar button 32 which indicates the desire to decrease the focus or attempt to remove some sound activity or event occurring around the time of the user input.

In this example, there may be some sound, for example a plane flying overhead, or a clap of thunder, which is problematic to the content author. By selecting (e.g., gesturing, such as pressing and/or holding) the demote or decrease button 32 around the time of the audio activity from the undesired object, the user is able to indicate to the system which object or activity is undesired.

By using spatial scene analysis, the system can identify with more specificity the activity and 'postcode' or spatial region associated with the object activity matching the user gesture. At this point, the system has available, to examine, the time range and the postcode or object of interest to be edited (in this case reduced or removed).

An intelligent system is proposed that then provides a small number of potential processing options, and allows the user to replay a short segment of the audio for each in turn in order to select the one that best reflects the user desire.

Figure 4:
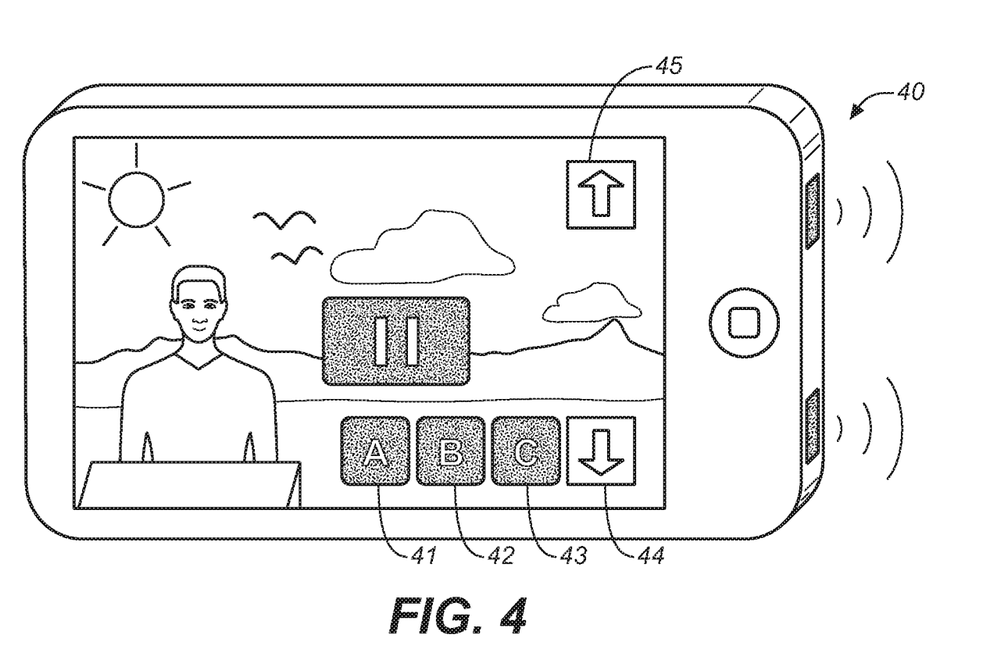
FIG. 4 shows a further schematic of the user interface illustrating the optional processing of audio.

For example, FIG. 4 illustrates a further user interface 40 after a gesture and selection of a region of time interest. The system waits for no further user activity and then returns to the start of problem segment in the video in pause. Additional UI controls 41-43 allow for the preview of alternate processing options and selection of a desired replacement.

The embodiments deal primarily, but not exclusively, with objects out of the camera field of view. In particular the use of the location information on the video display is not a necessary component of this embodiment. In many cases it is not necessary as the events are notable in the audio stream, temporary and therefore can be identified with this proposed simpler interface. It is also advantageous in that it requires less calibration and alignment to the video system.

Embodiment Details—Scene Analysis

At the core is the idea of utilizing the proximity and timing of a simple user input (e.g., user gesture, such as depressing and possibly holding a button) to work out the audio object of interest to manipulate. This involves an underlying scene analysis which operates best with multiple audio channels of input.

More detailed information on embodiments of such a scene analysis system are provided in the aforementioned United States Patent Application Publication US 2014/0241528 entitled "Sound Field Analysis System", and in "On the potential for Scene Analysis from Compact Microphone Arrays", by Glenn Dickins, David Gunawan, Dong Shi, AES $52^{nd}$ International Conference, (2013), the contents of which were previously incorporated by cross reference.

There are many other ways to determine effective source activity identification and mapping. The above references were found to be effective in one case.

In addition to the known processes of direction of arrival estimation and beamforming, the proposed scene analysis includes an accumulated or historical context of active regions of acoustic activity in the signal statistical space (which has an implied relationship to the physical space around the device).

Figure 5:
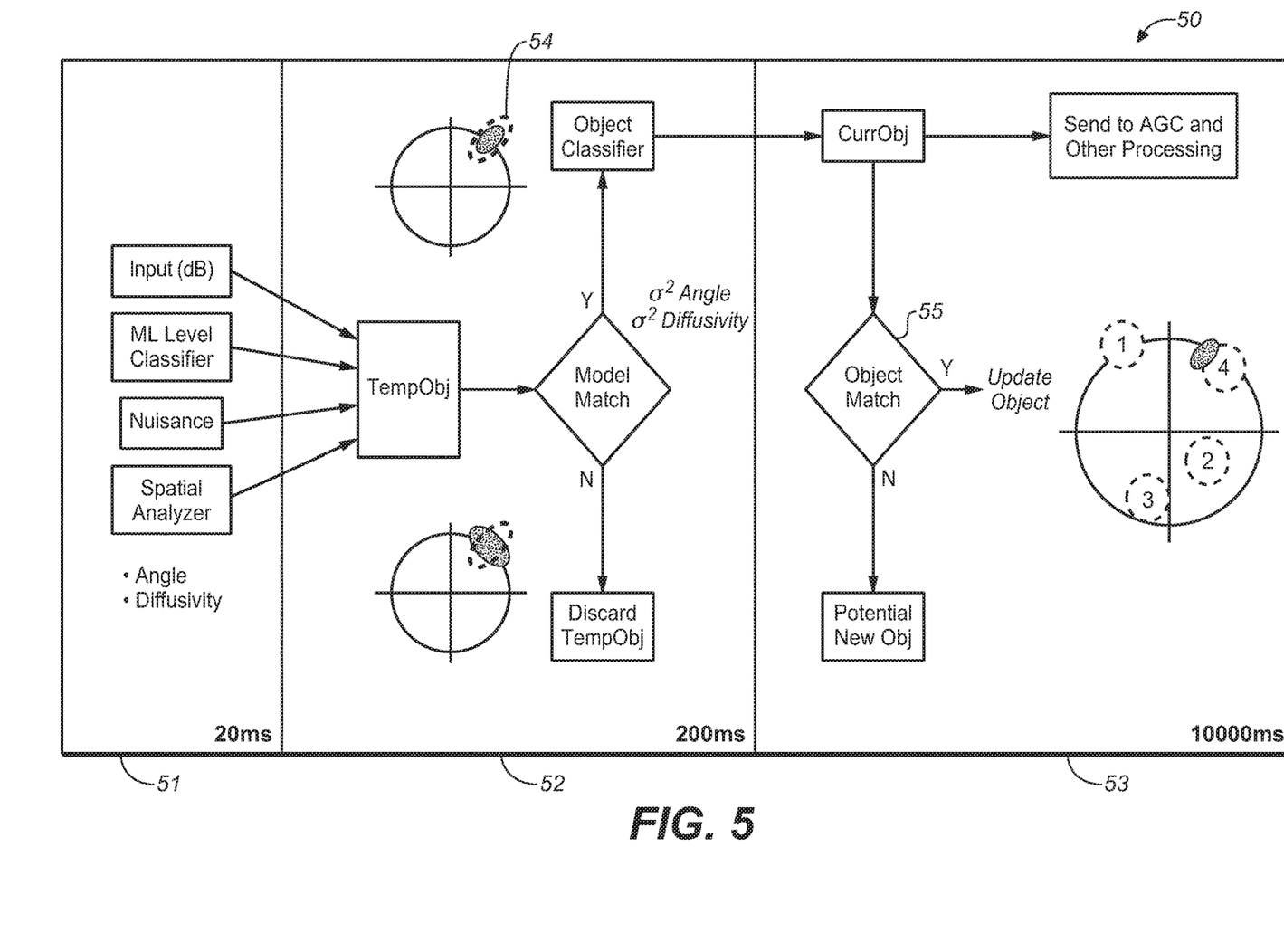
FIG. 5 illustrates a schematic of a scene analysis engine showing the instantaneous feature extraction, short term decisions and object association, and longer term intelligence to review and understand the scene.

FIG. 5 shows a schematic of a scene analysis engine showing the instantaneous feature extraction, short term decisions and object association, and longer term intelligence to review and understand of the scene.

A proposed scene analysis system could work in a way shown schematically in FIG. 5. Given an audio processing frame of 20 ms (or acceptable values in the range of 5-50 ms), an instantaneous feature is extracted 51 from the multichannel spatial microphone input. This can be used to infer a set of one of more audio object activity spatial or signal space regions (e.g., active postcodes) and potential objects. At a longer time frame, around 200 ms, a higher confidence decision 52 can be made that an actual object is present and active, and using the longer term map, this object 52 may be labelled and associated with past activity in the same post code. Longer term information 53 around the location, trajectory, activity and spectral characteristics of the object are retained in the auditory scene analysis object.

The key outputs from the scene analysis engine proposed above are as follows:

An indication of one or more objects 54 that are known to be currently active, with a near real time response (50-200 ms lag for reasonable confidence).

Accumulated statistics about the objects 55 in terms of how it presents in the multi-channel input statistical sense, or more specifically in the feature space and post-code representation (e.g., in terms of their activity over time in the multi-channel input in the feature space and postcode representation).

Embodiment Details—User Input and Object Identification

In the embodiments, the temporal activity and gesture from a user is associated with a potentially active object. For convenience, and since generally the media to be examined can be captured and processed offline and not necessarily in real time, it is possible to have object labels persistent across the content—that is a slot is defined for each object and it is possible to know it is not active prior to the first time it is presented in the content. This is a convenience for the following example and also feasible in the implementation.

Figure 6:
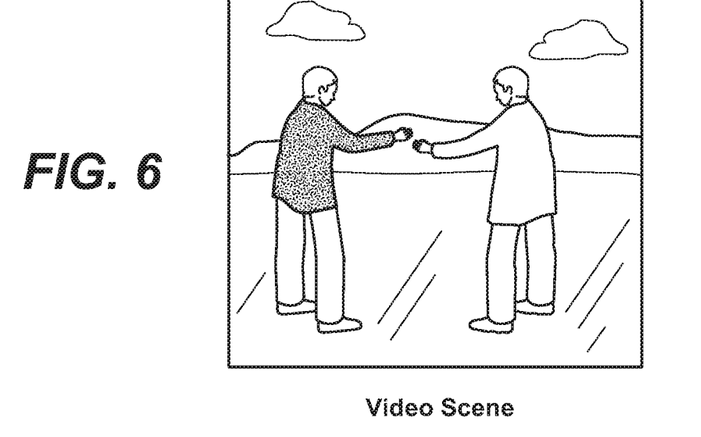
FIG. 6 shows a simple video scene with associated audio capture. The scene is of two people having a conversation.
Figure 7:
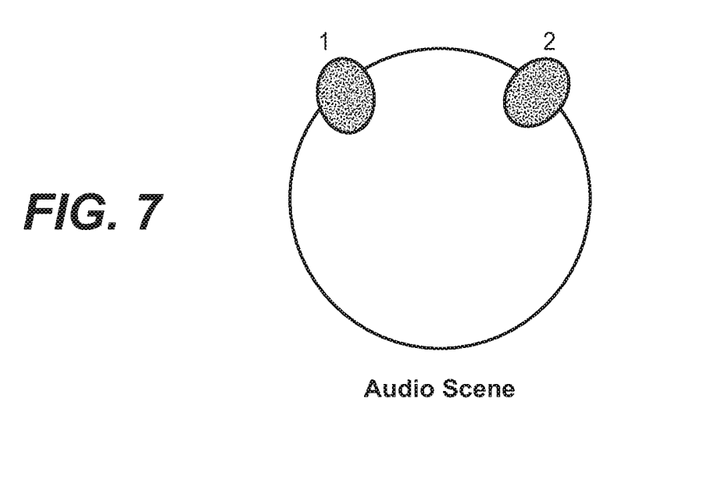
FIG. 7 illustrates the corresponding spatialization of audio for FIG. 6.
Figure 8:
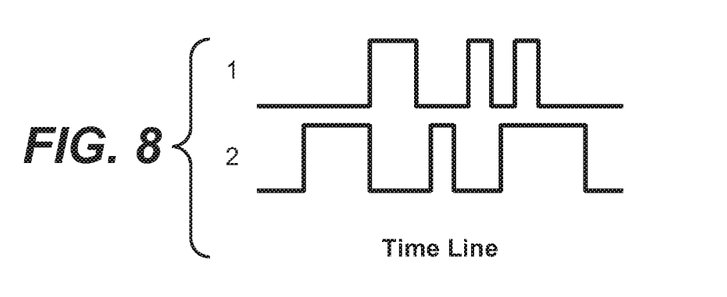
FIG. 8 illustrates a schematic audio timeline for the arrangement of FIG. 6.

Consider in FIG. 6, a scene where two people are talking and seen in the video frame. FIG. 7 shows the corresponding audio object scene analysis which is able to identify clearly these two objects and that they have a normal alternating conversation. FIG. 8 illustrates the normal corresponding time line, which also shows up to a point the normal conversation activity.

At some point in the capture, there may be a large undesired sound off camera, which may be moving. Perhaps a very loud truck passing on a road off to the right of the screen, for example. Since the device and microphone array will have a degree of surround sound response, the audio activity related to this undesired object will be quite separate in the scene analysis.

Figure 9:
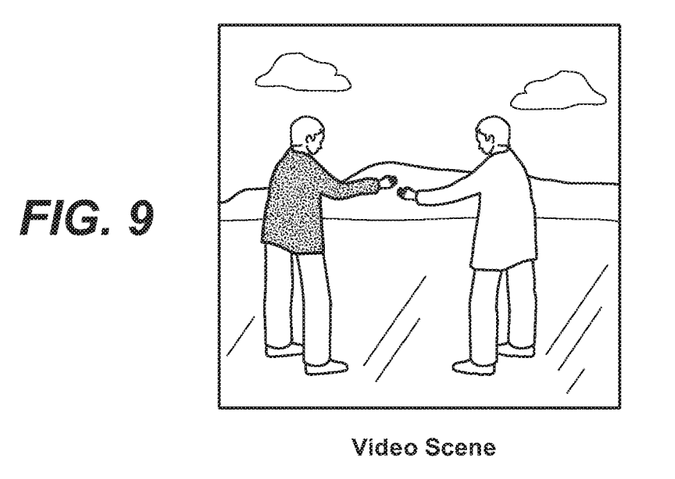
FIG. 9 illustrates an alternative video scene.
Figure 10:
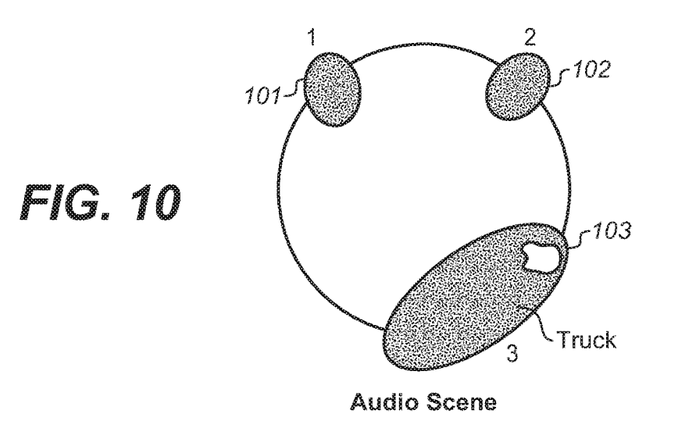
FIG. 10 illustrates the spatialization of audio around the arrangement of FIG. 9.
Figure 11:
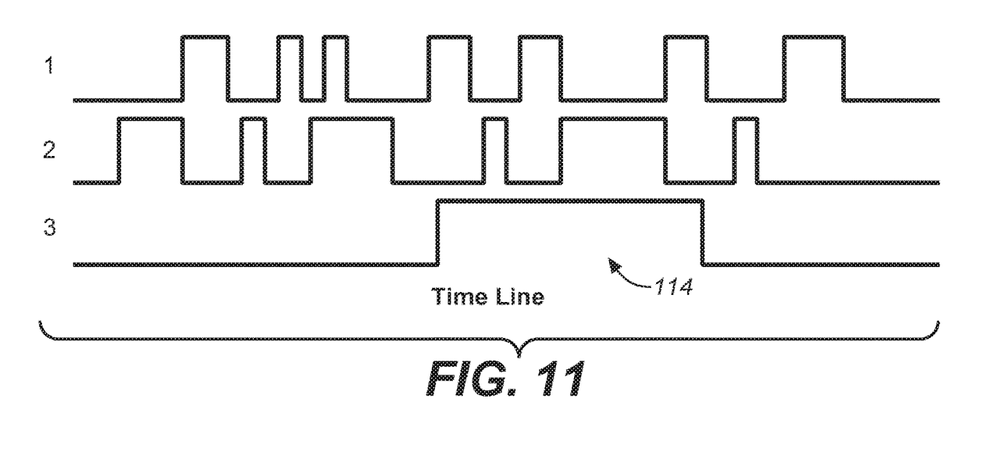
FIG. 11 illustrates a schematic of the corresponding time line of FIG. 9.

This is shown in FIG. 9 to FIG. 11. In FIG. 9, there is shown the video scene. In FIG. 10, there is shown the presence of the three sound sources 101, 102, 103 around a listener. FIG. 11 shows the corresponding time line, with the truck noise 114 occurring.

Hence, in the example, at some point in the capture, a loud sound source is present off screen and to the right. It is clearly a distinct object 103, and the audio scene analysis is able to recognize this. An example would be a loud truck passing nearby. The undesired audio is temporarily present in the scene.

Figure 12:
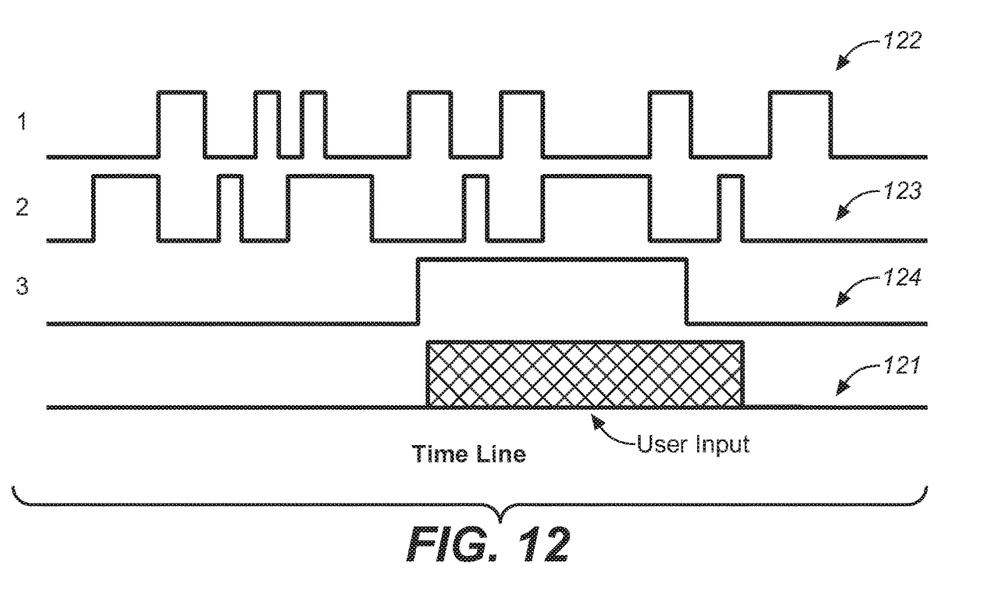
FIG. 12 illustrates the timeline of FIG. 11 with the addition of the user's interactive input.

In the embodiment and editing application, the user is previewing this content, and soon after the start of the undesired audio (e.g., the truck sound), signals a desire for change by pressing and holding a button (e.g., the demote button (44 of FIG. 4)) for the duration of the loud sound (and possibly for a short time afterwards). The user thereby provides a simple binary input across the time of the undesired sound object (e.g., the time interval during which the undesired sound object is present in the scene). From this simple scene, there is a clear association between the user input (e.g., user gesture) and the object or postcode activity (e.g., audio object activity spatial or signal space region) of the undesired sound. Examining the audio streams, there is a distinct similarity between the temporal nature of the user input 121 (e.g., user gesture, such as holding the button for the duration of the undesired audio) and the activity of the undesired object. Thus, the audio object that the user input was referring to can be determined based on the activities of the audio objects and the activity of the user input. Determining this audio object may be achieved by temporally correlating the user input (e.g., the user's selection of a segment of the audio clip) and an active audio object. Put differently, the audio object that yields the best (highest) temporal correlation with the user input may be determined as the audio object that the user input was referring to.

This leads to potential algorithms for deciding which object the user input (e.g., user gesture) was referring to. The simplest proposal and an effective embodiment is the hamming distance between the binary activity of each audio object and the (binary) user input (e.g., user gesture). The user input may be said to be binary in the sense that it indicates a given instance in time as either an instance in time at which the undesired audio is present, or an instance in time at which the undesired audio is not present. For example, the button may either be depressed and/or held (undesired audio present), or released (undesired audio not present). In the aforementioned example, it is evident that the hamming distances for the three objects across this time period are of the ratio order of 21:24:8. In fact, optionally using a window that extends prior and after the user input (e.g., user gesture) for a given period, e.g., a period of several seconds, the match is generally very indicative of the active object. Further, if a compensation buffer for the user start and hold over response delay is included, the hamming distance for this simple example to the undesired sound object would be very small. In general, the audio object that the user input was referring to can be determined based on the Hamming distance between (binary) activities of the audio objects and the (binary) user input.

Additional matching features can be utilised, such as the number of toggles or changes in the activity status of the gesture and the event. In this case, the audio scene objects for the people talking 122, 123, have 14 and 12 edges respectively for objects 1 and 2. Object 3 and the input gesture have only 2 edges 124. This approach works well for sounds that are dispersed in time, and the user can tap the pattern of events—for example a horn that beeps three times, and the user inputs three taps. In general, the audio object that the user input was referring to can be determined based on a comparison of toggles (changes, transitions, flanks, etc.) of the (binary) activities of the audio objects and the (binary) user input.

Finally, a combination of both the activity and transitions can be matched using forms of string distance and relaxation functions that are generally well known in the area of string search algorithm fields—for example bio-informatics and genetic codes. Generally, this would be considered a fairly trivial example of a match, where it is given a priori that all strings being matched are aligned in time.

Embodiment Details—Audio Processing Options

Continuing on the example above, a simple case where there is only one option available for audio processing is presented. That is, to find an object that matches and is present predominantly at the point of user gesture and attempt to suppress or remove it.

The value of this approach is that because the simple user interface has drawn the attention of the signal processing to the problem, it is possible to try different levels of suppression and removal of this sound, and let the user choose the balance of removal and audio artifacts. Generally, except in the case of very large numbers of microphones (>4) any signal processing to remove the sound will have some impact on the general scene, other objects and audio continuity. Without knowing the degree of displeasure a user has for this sound, it is difficult to make this trade off.

Hence the audio processing step can proceed as follows:

Identify the starting and ending times of a window surrounding the object audio around the proximity of the user input (e.g., user gesture), for example around the time or time interval of the user input. It may be necessary to extend the window.

Using the determined audio object activity spatial or signal space regions (e.g., postcode information) or any historical and accumulated information of the sound location and spectrum, tailor a filter (e.g., a linear or suppressive filter) specific to this noise source.

Run the filtering process with, for example, 3 levels of suppression depth or aggressiveness, applying appropriate edge transitions. Optionally, process the audio for an additional pre and post roll, e.g., of 1-2 seconds, to smoothly transition the signal processing in and out and allow for a preview of the processing in context of the content. This then creates, for example, three segments of alternate audio for the (time) region around where the user gestured.

Embodiment Details—Display and Selection

In a simple embodiment it is suggested that the user is given three buttons e.g. 41, 42, 43 of FIG. 4. The video and audio segment of interest plays in a loop, and the user may switch between the options (perhaps including the original). Alternatively the playback of the segment could be triggered when any of the three (or four with the original) buttons is pressed.

After some time to preview, the user makes a final selection, or reverts to the original—in which case the system may provide some further alternatives assuming that some decision was incorrect in the first set of options presented.

With minimal additional UI complexity, the system can cater for cases where there may be ambiguity or uncertainty in the object the user is indicating and/or the type of processing that is desired. Such a system can present more alternatives and learn or narrow in on the desires of the user with very simple and intuitive control input.

This approach of UI is common now in programs for manipulating images, where a preview is shown of the frame or video segment for each of several processing filters. Users can quickly preview and apply the desired filter or processing.

Embodiment Details—Global Filtering or Replace

In many cases, the unwanted audio activity may be reoccurring (for example, traffic passing the scene on a highway). A key indicator of this will be activity in the audio object activity spatial or signal space regions (e.g., spatial post code (or post codes)) that have been previously flagged as problematic by the user for the given content. This can be used in different ways, for example:

1. Improve the ability to identify and estimate a problem post code, audio object and desired filter by using previous cases and user selection.

2. Perform a matching search for similar examples across the entire content.

In the second case, this is similar to a 'replace all' operation available in modern word processors, where the system identifies the pattern and knows the desired processing. Each segment where there is a similar issue is located, and then previewed by the user prior to effecting the processing. Generally, and for the above example of loud traffic, this system is able to reliably detect the problem activity and process accordingly.

In this way, by providing an intuitive interface for removing some problem audio sources, the user is creating an intelligent processing system that has context and a targeted ability to manage dynamically audio events in the content with tailored processing.

The advantage of such a system is clear. It is immediately more likely to meet the user desire, rather than occasionally making incorrect assumptions, and with this confidence, the system can utilize more aggressive processing options around the identified segments.

Extensions

1. User Response Lag and Compensation

Generally the user interface will lag the audio activity in preview. This is an amount that could be estimated and/or learnt from system use, and it would be expected it is in the range of 200-1000 ms, for example. The proposed embodiments and algorithms in the description of the invention would take account of this, and appropriately shift the user input timing by an amount before working to match the object and inferred post code of the sound to manipulate. This step is not necessary, though will improve performance in very complex scenes with a lot of events and object activity. In other words, the user input timing (or time interval) may be shifted to an earlier time, in accordance with the lag, to compensate for the lag, especially when comparing (correlating) the user input with active audio objects.

2. Including a Broad Diffuse Object

The 'object' to be processed may in fact be no object, or identified as an event related to the background or change in the ambient and diffuse noise, or alternatively occur from a sound source that is pervasive enough to have no certain post-code (for example a thunder clap). Such audio sources may be managed in the application by virtue of an appropriate mapping (the infinite or pervasive source can be a feature space location), or else where there is a user gesture, and no specific object activity in the post code mapping, additional logic could identify the presence of events and broad temporary impact on the audio and apply potential template processing to then be assessed by the user.

3. Improvements to Global Search and Replace

For global search and replace, the following techniques can be used to increase the specificity and sensitivity of identifying potential regions of the content to process: Patterns are matched in terms of audio object activity spatial or signal space regions (e.g., post code location (acoustic proximity and direction)) as detailed above; Patterns are matched where the duration of the activity is similar; A count of audio events or activity edges around the object activity are similar; An analysis of the spectrum of the audio object provides similar answers; Other higher order features and classification match across the occurrences of activity in that post code.

The embodiments do not need to be compared to methods proposed for elaborate audio classification. Since the user is involved in the process, it is not necessary to actually classify and label the objects in the process, and minimal assumptions or projections about each object as to whether it is of interest or nuisance to the user need to be made. This approach, is both elegant and generally of more appeal to the user. It avoids false alarms and erroneous processing where the user has some unusual desire, and it gives the user a sense of purpose and creative control over the media which increases ownership and enjoyment in creating content.

4. Improved Scene Analysis Using Acausal Information

The discussion in respect of FIG. 5 provides an embodiment schematic for a real time scene analysis engine. Such processing may run in real time at the point of processing and create low bitrate metadata which can be encapsulated with the evolving scene and labels of currently active objects in each frame. However, in this context, the scene analysis engine is not restricted to run in real time. The content can generally be previewed and edited in an offline environment. Hence, the scene analysis is able to take advantage of using the entire context of the capture, and not restricted to causal information.

This has the following general advantages, which can be realized as an offline analysis and pre-processing step in the system: 1. The start of audio object activity can be formed with high confidence and no latency as we can search backwards to find the start of object activity; 2. Spatial feature analysis can be more comprehensive and work over larger segments to achieve improved source separation and resolution; 3. Additional analysis can be used to identify specific objects, for example specific recognition of the speaker or identity of the sound object. Although this may not be necessary in most cases, it may help identify repeated sound sources that do not necessarily remain in one post code, or alternatively objects that remain stationary in physical space however the microphone array may move 5. Non-Destructive Editing At least in the cycle of the user editing the content, rather than applying any process in a destructive and final way to the content, the system can keep a set of control parameters for processing and filters that vary across the content. For each condition and segment that the user changes the effective processing by way of the interface, the resultant trajectory of any signal processing parameters can be kept. In this way, the user may return to segments and change their mind, and additionally, multiple aspects of signal processing over overlapping segments may be combined and only applied in one pass of signal processing (results in better audio quality).

Such non-destructive editing may continue with the content in the form of meta-data, or alternatively a final stage of proofing, user approval and then mastering would apply the designed signal processing throughout the content.

6. Incorporating Pose Estimation

Where the audio space objects have some physical representation, changes in the orientation of the microphone array can represent continuous trajectories of objects in the microphone feature space. It is envisaged that an embodiment with a moving camera can take advantage of this to keep a relative continuity between the appearances of objects in a positionally corrected post code space, and their stationary location in physical space.

Example Decision Tree

Receive a user input (e.g., user gesture, such as pressing and/or holding of a given button), wait for end of input and some time to elapse Is there an identifiable or high likelihood object associated with that time?

If YES:

Was the user asking for promote or demote?

Promote: Perform an isolation or enhancement with 3 levels

Demote: Attempt to remove the sound in that post-code with 3 levels
If NO:
Was there an identifiable change in overall signal level and activity (non-spatial)?
If YES:
Use an alternate signal processing over that period—e.g. faster noise floor tracking, greater noise immunity
If NO:
Was there an object active just previous to the press?
If YES:
Was this an object that has been flagged as problematic or for promotion previously?
Promote: Extend classifiers or identification of that object to avoid clip by 3 different times
Demote: Use a previously selected processing or present three options of removal
If NO:
Try something random—maybe learn the user preference in another way
Infer that the user has heard artifacts of processing—so change strategy or back off Example Processing Options
Processing options—suggest values:
Suppress object, e.g., modulate the depth of removal vs scene distortion
Enhance object, e.g., modulate the degree of isolation (quality) and boost
Advise any logic (e.g., gating or switching) to pre-empt or hold over
Context Suppression
Reverb suppression change if it is a distant object
Sibilance suppression change if it is a near object
Levelling changes if it is something that is quite different in level
Change the previous level of processing to reveal more detail or reduce artifacts
Change the spatial perception of an object—focus, spread, pan (front, rear)

Example Processing System

Figure 13:
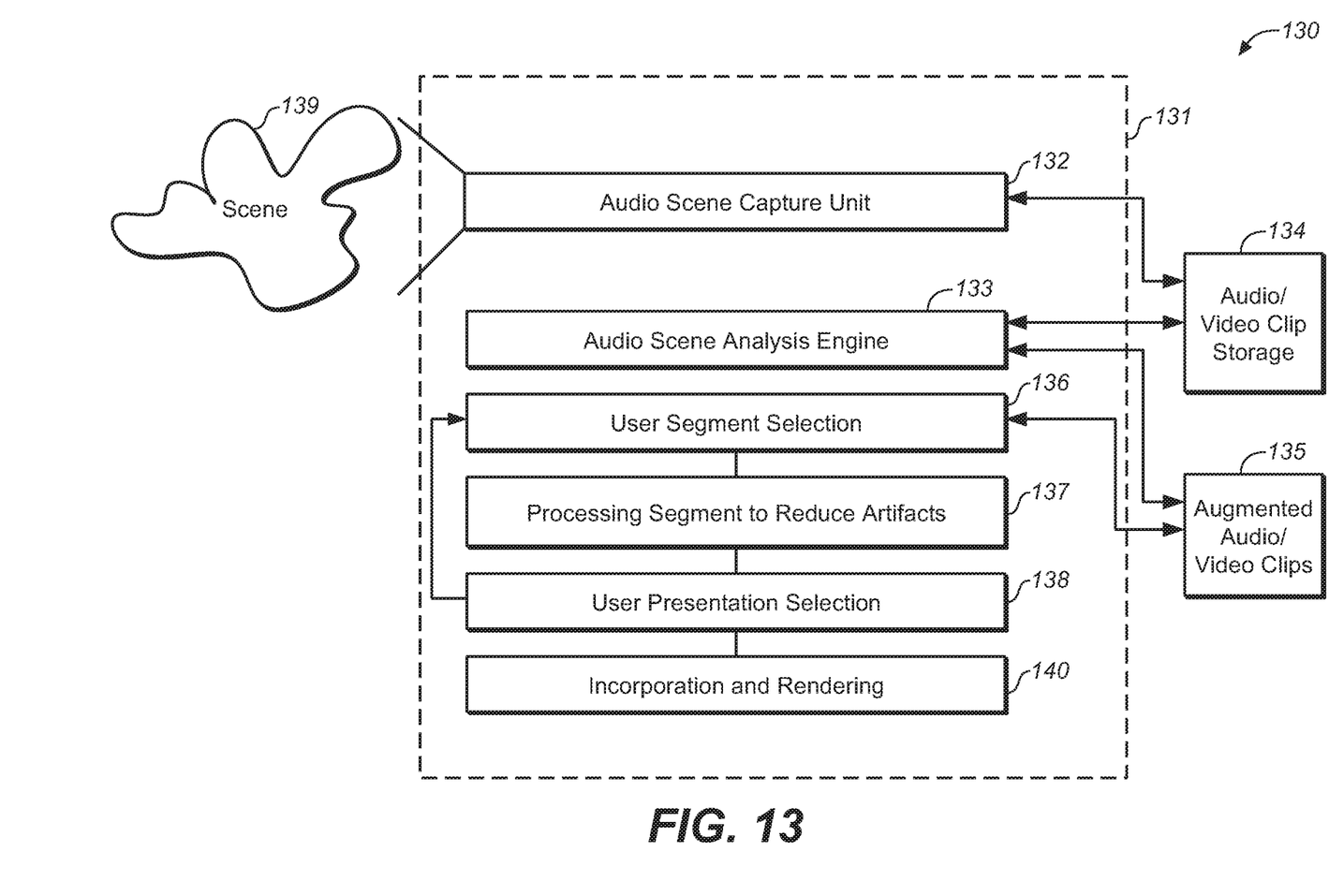
FIG. 13 illustrates schematically one form of example architectural design for the execution of the embodiments.

Turning now to FIG. 13, there is illustrated one example system arrangement of an embodiment suitable for use with the present system.

The arrangement can be based around a suitably programmed computational resource such as a powerful tablet or mobile phone type device. For example, an Android programmed or Apple IOS programmed device.

Further, as will be evident to those skilled in the art of computer programming of these type of devices, there can be a delineation in a client server architecture as to what operations are completed on which device. Whilst the delineation is dependent on the architectural needs, one form of system that is substantially delineation agnostic will be described hereinafter.

Initially, the computational resource is utilised in the form of an audio scene capture unit 132 to capture a scene 139. The captured audio stream, including multichannel audio content, and any associated spatial orientation information is stored in a storage facility 134.

Next, as part of the application, the audio scenes stored 134 are downloaded and analysed by Audio Scene Analysis engine 133. The Audio scene analysis engine 133 performs the audio scene analysis. Whilst any suitable technique can be used, one option is to utilize the technique in accordance with the aforementioned patent application so as to provide an output which includes augmentation with the spatial characteristics of the audio scene. The results of the analysis are stored as augmented audio clips 135. This process can be carried out in an offline cloud environment if necessary.

Next, an interactive user environment is provided 136 for the user to interactively review the audio clips to determine those portions of the clips that contain unsuitable audio segments. Upon selection of one of these segments by a user, the segment is processed 137 to reduce the unwanted artefact (either to enhance or demote the spatial audio component). The results are presented to the user 138 for their acceptance.

Depending on the functionality requirements, the system can then iterate back to the selection of other segments by a user 138. This can be either semi-automatically to locate similar audio occurrences, or it can be via the user manually listening to the remainder of the audio clip and performing further selections.

Finally, the audio clips can be 'rendered' 140 to produce a newly processed version of the audio for output.

The embodiments therefore proved a simplified interface for audio editing. This includes a general flow of: providing a simple button interface for the user to press around the time or in time with audio activity of interest. A spatial location, beamforming or postcode system then looks at activities in the regions and finds the region that has a similar temporal envelope that matches the user gesture. Subsequently, a few audio processing options that operate primarily or preferentially on input having the related spatial characteristics (position, angle, covariance etc.), are presented to the user for selection of the appropriate alternative.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for interactive and user guided manipulation of multichannel audio content, the method including the steps of:
  (a) providing a content preview facility for replay and review of the multichannel audio content by a user;
  (b) providing a user interface for user selection of a segment of the multichannel audio content having an unsatisfactory audio content, wherein the segment of the multichannel audio content starts at a starting time when the user makes a first user gesture in response to a presence of an audio activity in the unsatisfactory audio content during a replaying of the multichannel audio content and ends at an ending time when the user makes a second user gesture in response to an absence of the audio activity in the unsatisfactory audio content during the replaying of the multichannel audio content, wherein the segment of the multichannel audio content includes an audio clip within a time duration between the starting time and the ending time;
  (c) processing the multichannel audio content to determine associated audio object activity spatial or signal space regions, to create a time line of activity where one or more spatial or signal space regions are active at any given time;
  (d) temporally correlating the user's selection of the segment of the multichannel audio content against at least one of the active spatial or signal space regions;
  (e) signal processing audio emanating from the correlated active spatial or signal space region, to determine at least one processed alternative of modified audio;
  (f) providing the user with an interactive playback facility to listen to the at least one processed alternative of modified audio; and
  (g) upon user approval, updating the multichannel audio content to incorporate the processed alternative into the multichannel audio content,
  wherein step (c) involves performing a scene analysis of the multichannel audio content for determining the object activity spatial or signal space regions.

2. A method as claimed in claim 1, wherein step (d) involves comparing the user's selection of the segment of the multichannel audio content to the activity of the one or more spatial or signal space regions over time.

3. A method as claimed in claim 1, wherein step (e) involves processing the audio emanating from the correlated active spatial or signal space region using a number of different techniques, the number corresponding to a number of processed alternatives of modified audio.

4. A method as claimed in claim 1, wherein step (e) involves applying at least one filter to an audio object associated with the correlated active spatial or signal space region.

5. A method as claimed in claim 1, wherein step (e) involves applying either enhancement or diminution filters, depending on the user's choice, to respectively enhance or reduce the relative importance of an audio object associated with the correlated active spatial or signal space region.

6. A method as claimed in claim 1,
  wherein step (e) involves signal processing to determine a plurality of processed alternatives of modified audio; and wherein step (f) involves providing the user with an interactive playback facility to listen to the plurality of processed alternatives of modified audio, and receiving the user's selection of one of the plurality of processed alternatives of modified audio.

7. A method as claimed in claim 1, wherein the user interface for the user selection of a segment includes a button activation interface.

8. A method as claimed in claim 7, wherein said button activation interface comprises depressing a single button for a time period whilst audio content is unsatisfactory.

9. A method as claimed in claim 1, further comprising the step of:
(h) iteratively searching the multichannel audio content for a further segment of multichannel content having active spatial or signal space regions, setting the segment in step (d) to the further segment, and applying the processing of steps (c) to (f) to the identified further segments.

10. A method as claimed in claim 1, wherein said step (e) further comprises utilising a number of changes in activity state to determine which active spatial or signal space region to apply signal processing to.

11. A system comprising:
one or more processors that execute instructions to carry out a method for the interactive and user guided manipulation of multichannel audio content, the method including:
analysing separate spatial characteristics of audio sources in the multichannel audio content producing corresponding approximate audio spatial characteristics for the audio sources, wherein a scene analysis of the multichannel audio content is performed for determining the audio sources in the multichannel audio content;
receiving selection by a user of at least one problematic audio segment of the multichannel audio content having an unsatisfactory audio content for analysis, wherein the problematic audio segment of the multichannel audio content starts at a starting time when the user makes a first user gesture in response to a presence of an audio activity in the unsatisfactory audio content during a replaying of the multichannel audio content and ends at an ending time when the user makes a second user gesture in response to an absence of the audio activity in the unsatisfactory audio content during the replaying of the multichannel audio content, wherein the problematic audio segment of the multichannel audio content includes an audio clip within a time duration between the starting time and the ending time;
correlating the selected audio segment with an audio source selected from the audio sources;
selectively applying signal processing to alter audio characteristics of the selected audio source relative to other non selected audio sources in the audio sources;
displaying a number of alternative audio filtered segments of the selected audio source for review by the user, and selection of a desired response; and
integrating audio effects of the selected audio source into the multichannel audio content upon selection by the user.

12. A system as claimed in claim 11, wherein the method further comprises filtering unit adapted to apply at least one filter to alter the audio characteristics of the selected audio source relative to the other non-selected audio sources.

13. A system as claimed in claim 12, wherein the method further comprises applies either enhancement or diminution filters to said selected audio source depending on a user's choice.

14. A system as claimed in claim 11, wherein the method further comprises comparing the user's selection of the problematic audio segment of the multichannel audio content to an activity of the one or more audio sources.

15. A system as claimed in claim 11, wherein the method further comprises reviewing other portions of the multichannel audio content for other sound sources to be correlated to the selected audio segment.

* * * * *